United States Patent
Ridler

(10) Patent No.: US 7,459,006 B2
(45) Date of Patent: Dec. 2, 2008

(54) ELECTROMAGNETIC PYROLYSIS METALLURGY

(75) Inventor: Roland Ridler, Willowdale (CA)

(73) Assignee: Golden Wave Resources Inc., Toronto (CA)

(*) Notice: Subject to any disclaimer, the term of this patent is extended or adjusted under 35 U.S.C. 154(b) by 28 days.

(21) Appl. No.: 10/496,509

(22) PCT Filed: Nov. 25, 2002

(86) PCT No.: PCT/CA02/01777

§ 371 (c)(1),
(2), (4) Date: May 21, 2004

(87) PCT Pub. No.: WO03/046231

PCT Pub. Date: Jun. 5, 2003

(65) Prior Publication Data

US 2005/0016324 A1    Jan. 27, 2005

(30) Foreign Application Priority Data

Nov. 23, 2001   (CA) ..................................... 2363762

(51) Int. Cl.
C22B 9/14   (2006.01)
C22B 11/00   (2006.01)
C22B 15/00   (2006.01)
C22B 4/00   (2006.01)

(52) U.S. Cl. ..................... 75/10.13; 75/10.62; 75/637; 75/641

(58) Field of Classification Search ............... 75/10.13, 75/10.62, 637, 641
See application file for complete search history.

(56) References Cited

U.S. PATENT DOCUMENTS

| 4,311,520 | A | * | 1/1982 | Kruesi et al. ............... 75/10.13 |
| 4,324,582 | A | * | 4/1982 | Kruesi et al. ............... 75/10.13 |
| 4,814,003 | A | * | 3/1989 | Bergner ...................... 266/171 |
| 4,906,290 | A |   | 3/1990 | Worner |
| 5,024,740 | A |   | 6/1991 | Birken et al. |
| 5,824,133 | A | * | 10/1998 | Tranquilla ................. 75/10.13 |
| 6,090,350 | A | * | 7/2000 | Birken et al. ................ 422/186 |
| 6,277,168 | B1 | * | 8/2001 | Huang et al. ............... 75/10.13 |
| 6,660,059 | B2 | * | 12/2003 | Ji et al. .......................... 75/744 |

FOREIGN PATENT DOCUMENTS

| EP |   | 0 098 595 A |   | 1/1984 |
| SU |   | 1700071 A | * | 12/1991 |
| WO |   | WO 92/18249 | * | 10/1992 |
| WO |   | WO0120228 A1 | * | 3/2001 |

OTHER PUBLICATIONS

Webster's Seventh New Collegiate Dictionary, 1965, pp. 536 and 697.*

(Continued)

*Primary Examiner*—Roy King
*Assistant Examiner*—Tima M McGuthry-Banks
(74) *Attorney, Agent, or Firm*—Blake, Cassels & Graydon LLP; Santosh K. Chari

(57) ABSTRACT

A method to enhance the extraction of an element from an ore includes subjecting the ore, or element bearing material to electromagnetic radiation to induce pyrolysis of the material. The residue of the pyrolysis may then be processed in a conventional manner to extract the element. The radiation used in the invention has a wavelength longer than microwave radiation, and is preferably 100 mm or longer. Preferably, radio waves are used as the radiation to effect pyrolysis.

18 Claims, 2 Drawing Sheets

OTHER PUBLICATIONS

Vorster et al., "The effect of microwave radiation upon the processing of Neves Corvo copper ore", Int. J. Miner. Process. 63 (2001) 29-44, Jun. 2001.*

Wan, J.K.S., et al: "High-Power Pulsed RF Decomposition of Ore Samples with a Carbon Source" Journal of Microwave Power and Electromagnetic Energy, 1996, Int. Microwave Power Inst., USA, vol. 31, No. 1, pp. 54-58, XP009007396, ISSN: 0832-7823.

* cited by examiner

ELECTROMAGNETIC PYROLYSIS METALLURGY

This application is a national entry of PCT application number PCT/CA02/01777, filed on Nov. 25, 2002, which claims priority from Canadian patent application number 2,363,762, filed on Nov. 23, 2001.

FIELD OF THE INVENTION

The present invention relates to the extraction of elements such as metals from ores containing such elements.

BACKGROUND OF THE INVENTION

It is well known that an elemental material may be extracted from an ore using various chemical processes. Element bearing ores are mined and refined and the desired elements extracted through processes that utilize a number of different physical and chemical properties of the ore and the element(s).

In some circumstances, the ore may contain significant quantities of the element to be extracted, which cannot be recovered with conventional extraction processes. In other cases, the extraction process is capable of extracting the base element, although the structure or physical characteristics of the ore inhibit that process and therefore the effective yield is significantly reduced.

Pyrolysis is a known method of recovery of elements from an element bearing material such as ore. It is a form of destructive distillation. However, traditional methods used to induce pyrolysis require the bulk heating of the entire element bearing compounds. This heating requires large amounts of energy and is known to be thermally inefficient. Further, heating by conventional means so as to facilitate combustion, for example heating ores in the open air (through a kiln or fire) or using a reducing agent such as carbon, is difficult to control especially when many compounds are readily combustible in the presence of oxygen. A further combustion technique known as roasting often produces toxic gases such as carbon monoxide.

It is therefore an object of the present invention to provide a process and apparatus which generally avoids combustion and thus obviates and mitigates at least some of the above mentioned disadvantages.

DESCRIPTION OF THE PRIOR ART

U.S. Pat. No. 3,979,265 discusses the recovery of metals from sulphur bearing ores. This patent teaches the treatment of the ore with sulphur monochloride followed by an ammonium solution resulting in the metals forming water-soluble amine complexes which can subsequently be extracted.

U.S. Pat. No. 6,159,268 teaches a process for pyrometallurgical processing in a furnace chamber. This process involves a reducing gas blown onto the surface of a smelt in which metal oxides are present in a molten state. This patent is directed to a waste material having both organic and metal compounds contained therein, and is applied to a material in the molten state.

U.S. Pat No. 5,575,334 teaches the recovery of both copper and zinc from sulphide ores. The extraction process involves the use of plant derived ortho-quinone to promote the chemical modification of the metal containing ore.

U.S. Pat. No. 4,160,663 teaches a method for the direct reduction of iron ore. Ore is placed in a furnace along with a carbonaceous fuel into which both oxygen and hot steam are introduced. Pyrolysis of the carbonaceous fuel is induced in the presence of oxygen and the fuel reacts with the steam to produce a "reducing gas" which initiates the reduction of the iron ore.

U.S. Pat No. 5,824,133 teaches the treatment of ores with microwave radiation to bring about metallurgical effects. A feed material in the form of a thin stream is rapidly passed through a resonant microwave cavity and subjected to microwave energy. Optimization of electrical field strength in the vicinity of the ore minimizes the energy dissipation such that the bulk temperature rise in the material is limited to a few degrees above ambient. The patent teaches delivering microwave energy through a wave guide generator to the cavity.

SUMMARY OF THE INVENTION

It is accordingly a principal objective of the present invention to establish a method to enhance the extraction of an element from an ore by inducing pyrolysis in the element bearing material, typically an ore. Pyrolysis is induced through exposure to a relatively short duration of intense electromagnetic radiation. The heat induced by the electromagnetic radiation causes pyrolysis or destructive distillation such that the volatile constituents of an ore are partially driven off or thermally degraded and leaves behind a porous solid residue. Extraction of the element from the residue is then performed by further processing in a conventional manner at a relatively higher yield than would otherwise be the case.

Electromagnetic radiation is provided by longer wavelengths such as radiowaves, typically of the magnitude of 100 mm or greater, delivered over a period of time sufficient to induce pyrolysis of the element bearing ore.

Thus, in a preferred embodiment, the invention provides a method of extracting an element from an ore including the steps of:
  inducing pyrolysis of the ore by subjecting the ore to electromagnetic radiation having wavelengths longer than microwaves; and
  processing the pyrolyzed ore to extract the element from the material.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Briefly, the present invention provides a method to enhance the extraction of an element(s) from an ore, or other such material bearing the element(s), comprising subjecting the ore to electromagnetic radiation to induce pyrolysis of the material. Pyrolysis causes the volatile constituents of the material to be driven off leaving behind a solid residue. The residue resulting from the pyrolysis will have undergone a chemical and physical transformation due to heating and the loss of the volatile constituents. The residue may then be processed in a conventional manner to extract said element at a relatively higher yield than obtained with known prior art methods.

Figure 1:
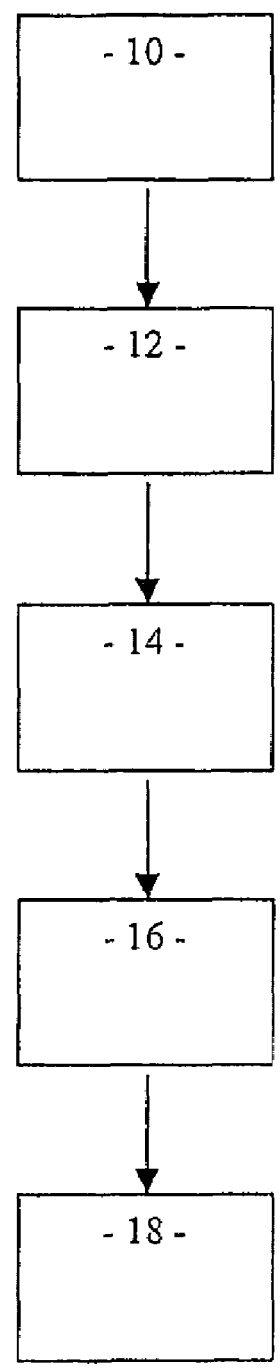
FIG. 1 is a schematic flow diagram illustrating the process of the present invention.

Referring to the process illustrated generally in FIG. 1, an element-bearing material, typically ore, is initially mined and crushed 10 to a uniform size. Although the following description will refer to "ore", it will be understood that the invention can be used with any element (i.e. metal) containing material such as tar sands etc. At this point, the ore may be concentrated, 12 using any well-known concentration techniques such as flotation. The concentrated ore is then subjected to an endothermic destructive distillation step 14. During the distillation step, the ore is heated, typically in the absence of oxygen, to facilitate a chemical breakdown of the ore. This step is discussed further below. Following the destructive distillation, the ore yields a new mineral and is passed on to the extraction stage 16, where it is processed in any one of a number of conventional ways to extract the required elements. Finally, the remaining ore material is disposed 18 in a generally known manner.

Figure 2:
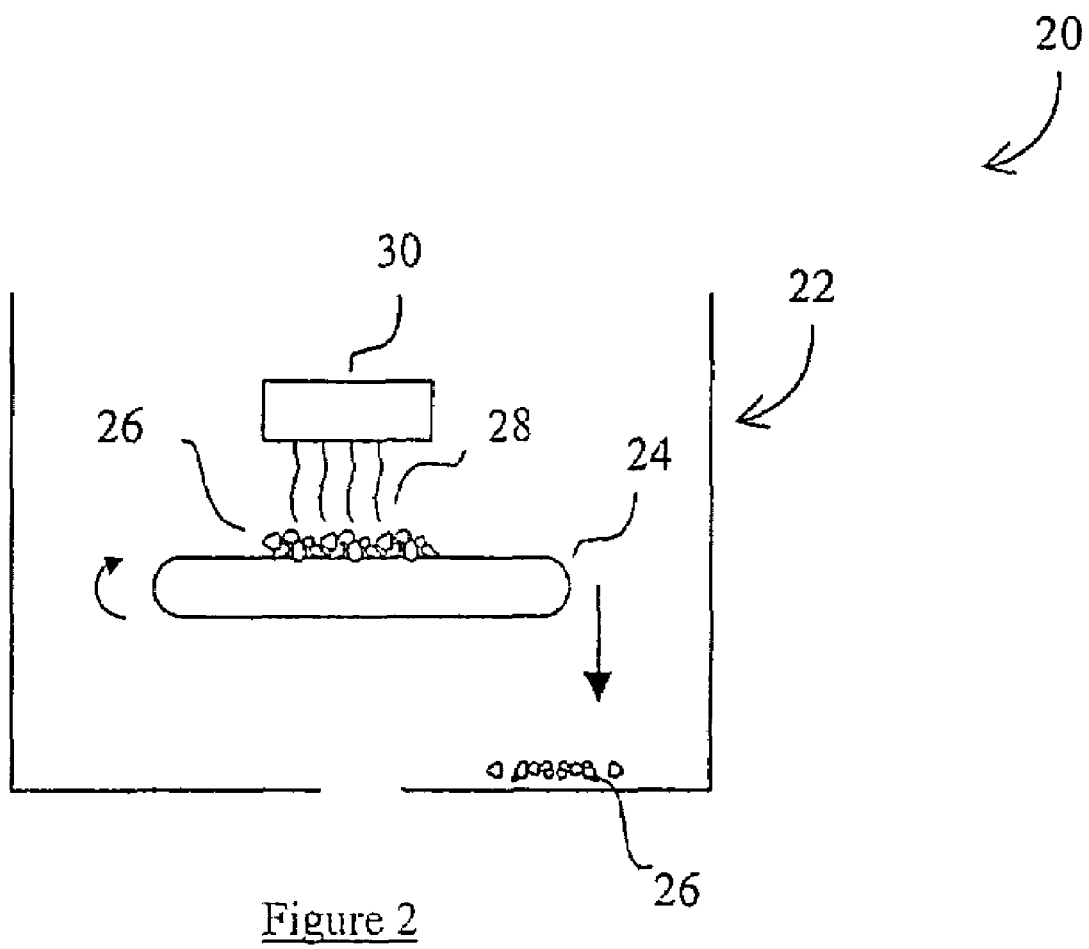
FIG. 2 is a schematic diagram of the pyrolysis apparatus used in the process as shown in FIG. 1.

The endothermic distillation process 14 is illustrated further in FIG. 2. Endothermic destructive distillation, otherwise known as pyrolysis, comprises the heating of a material to cause a physical and chemical transformation in that material. Heat causes the volatile constituents of the material to be driven off or thermally degraded in the absence of oxygen. A chemical breakdown of the material also occurs, resulting in the formation of a porous solid residue.

In the schematic drawing shown in FIG. 2, a preferred apparatus for conducting the pyrolysis step 14 is generally shown at 20. The apparatus includes a chamber or housing 22 enclosing a belt or trolley 24 which receives the concentrated ore 26. The ore is exposed to electromagnetic radiation 28, from a radiation source 30, to cause heating of the ore. Exposure to a sufficient duration of intense electromagnetic radiation induces pyrolysis of the ore which, in turn, causes the volatile constituents of the ore bearing material to be partially driven off and leaves behind a porous solid residue 26. It is from this residue that the extraction of the element may then be performed by any conventional means.

The limited duration of exposure of the ore to the electromagnetic radiation in an endogenous anoxic (oxygen free) environment prevents complete combustion of the ore. This environment is internal and within the ore itself. Pyrolysis instead breaks down the chemical structure of the element-bearing material at a high temperature in the absence of oxygen. Pyrolysis begins when the ore bearing material is heated to a sufficient temperature so as to cause the thermal degradation of the volatile constituents contained therein. The actual temperature is dependent on the composition the ore and the temperature at which those components volatilize. These volatile constituents, once volatilized, typically form gases which are driven off. This does not require the bulk heating of the entire ore to such a temperature. Once the volatile material has been driven off, there is a remaining porous solid residue. This residue typically contains the same amount of the desired element as present in originating concentrated ore; however, the residue has undergone both a chemical and physical transformation due to heating and the loss of the volatile components. The ore has recrystallized to new materials. The transformation facilitates the efficient recovery of the element contained within the residue through further processing. For example, in the case where the element gold (Au) is to be extracted from an ore bearing that element, namely gold-bearing arsenopyrite, on exposing the arsenopyrite to electromagnetic radiation so as to induce pyrolysis, the resulting residue is a gold-bearing porous pyrrhotite. This residue is readily permeable to leaching. The element, gold, is readily extracted from the residue, for example by conventional cyanidation. Other extraction processes will be apparent to persons skilled in the art and will be dependent upon the element or metal being extracted.

The radiation 28 used in the present invention is chosen to impart sufficient energy to both induce pyrolysis of the concentrate ore and cause uniform pyrolysis. Prior investigation by the inventors determined that pyrolysis can be achieved with microwaves at 40,000 watts. However, the shorter wavelengths of microwaves were found to result in inhomogeneity. It was therefore determined that longer wavelengths such as radio waves would be better suited for this purpose. In the preferred embodiment, the invention utilizes radiation of longer wavelengths, such as radiowaves, as opposed to that of shorter wavelengths such as microwaves. The longer wavelength radiation provides a uniform wavelength field resulting in complete and uniform pyrolysis. In the preferred embodiment, the wavelength of the radiation is 100 mm or greater.

The exposure of the element bearing ore to the electromagnetic radiation serves to cause a localized heating of the volatile components ore bearing material and avoid the time and energy required for a bulk heating of the entire ore material. The limited duration exposure of the ore to electromagnetic radiation and the oxygen-free environment typically prevents combustion. The period of time over which the electromagnetic radiation is delivered to the ore material is meant to be a sufficient time to induce pyrolysis so as to cause thermal degradation of the volatile constituents of an ore leaving behind a residue ideal for further extraction processing. It is preferable to use radiowaves or other longer wavelengths in order to provide a uniform wavelength of the radiation field needed for complete pyrolysis.

In summary, the prior art establishes that the incomplete combustion, or pyrolysis, of refractory ores of gold significantly improves recoveries over conventional methods. However, prolonged consumption of relatively large amounts of energy was required since the reactions involved are endothermic and the necessary bulk heating of the ore (including various volatile components) is inherently thermally inefficient. Moreover, pyrolysis is difficult to control using conventional method since sulfides, which are normally present in the ores, are combustible and ignite relatively easily in the presence of oxygen. Burning of the ore to a sinter, a process referred to as "roasting" resulted in a mass from which gold is easily extracted. However, such roasting methods result in the formation of toxic gases. As an alternative to the above methods, the prior art also provides for a pyrolysis step that is started by irradiating material with intense electromagnetic radiation, particularly microwaves. Combustion of the ore was prevented by limiting the duration of exposure to the radiation.

An example of the microwave pyrolysis process can be summarized as follows: exposure of refractory gold bearing arsenopyrite (Fe AsS+refAu) to microwave energy produces a residue of porous pyrrhotite (Fe(1-x)S+solAu) and a condensate of realgar (AsS), orpiment ($As_2S_3$) and native sulphur. The gold is readily extracted by conventional cyanidation from the porous pyrrhotite.

Although overcoming some of the shortfalls associated with combustion methods, the above mentioned microwave treatment still resulted in non-uniform results. The present inventors have postulated that such non-uniformity is the result of the extremely short wavelengths of the microwave radiation. In the result, the present inventors have proposed the use of radiation of longer wavelengths such as radio waves, which provide a more uniform field.

Although the above discussion has focussed on gold containing ores, it will be apparent to persons skilled in the art that various other element containing ores can be subjected to the same treatment disclosed herein. One example of other such ores is chalcopyrite, $CuFeS_2$, which is a copper containing ore. Pyrolysis of this ore will produce porous pyrrhotite, native copper and sulphur condensate. The native copper can be recovered in an inexpensive manner by known methods.

The process of the present invention can be used in both continuous, batch or staged batch modes.

EXAMPLE 1

An amount of ore, specifically gold bearing arsenopyrite (FeAsS+refAu) was subjected to electromagnetic radiation. The radiation wavelengths used were of a magnitude greater than 100 mm and a frequency less than 1000 MHz. The ore was heated to a temperature not greater than 550 degrees Celsius and was subjected to radiation for a period of time not less than one minute and not greater than one hour. Following this time interval, a residue of porous pyrrhotite (Fe(1-x)S+solAu)+a spatially separate condensate of reaglar (AsS)+ orpiment ($As_2S_3$)+native sulfur (S) was formed. The porous pyrrhotite was then subject to cyanidation so as to extract the gold.

The preferred wavelength for the electromagnetic radiation is a magnitude greater than 100 mm and frequency less than 1000 MHz.

Although the invention has been described with reference to certain specific embodiments, various modifications thereof will be apparent to those skilled in the art without departing from the spirit and scope of the invention as outlined in the claims appended hereto.

The invention claimes is:

1. A method of extracting an element from an ore including the steps of:
   irradiating the ore, without addition of carbon, with electromagnetic radiation having wavelengths longer than microwaves, said irradiation being continued until the ore is physically and chemically transformed into a porous solid residue; and
   processing the physically and chemically transformed ore to extract said element from said residue.

2. The method of claim 1 wherein said electromagnetic radiation is radio waves.

3. The method of claim 1 wherein said electromagentic radiation is delivered over a period of time suffiencient to induce said physical and chemical transformation of said ore but insufficient to initiate complete combustion of said ore.

4. The method of claim 1, wherein the ore is completely transformed into a poruous and solid residue.

5. The method of claim 1, wherein the ore is uniformly transformed into a porous and solid residue.

6. The method of claim 1 wherein said method is conducted in continuous batch or staged batch modes.

7. The method of claim 1 wherein said processing involves chemical or mechanical processing.

8. The method of claim 1 wherein said irradiation is conducted in an essentially oxygen free environment.

9. The method of claim 1 wherein said element comprises gold or copper.

10. The method of claim 1 wherein said ore is a gold containing arsenopyrite.

11. The method of claim 1 wherein said ore is a copper containing chalcopyrite.

12. A method of extracting an element from an ore including the steps of:
    irradiating the ore, without addition of carbon, with electromagnetic radiation having wavelengths longer than 100 mm, said irradiation being continued until the ore is physically and chemically transformed to a porous solid residue.
    processing the physically and chemically transformed ore to extract said element from said residue.

13. The method of claim 12 wherein said electromagnetic radiation comprises wavelengeths having a frequency less than 1000 MHz.

14. The method of claim 12 wherein said electromagnetic radiation is delivered over a period of time sufficient to induce said physical and chemical transformation of said ore but insufficient to initiate complete combustion of said ore.

15. The method of claim 12 wherein said irradiation is conducted in an essentially oxygen free environment.

16. The method of claim 12 wherein said element comprises gold or copper.

17. The method of claim 12 wherein said ore is a gold containing arsenopyrite.

18. The method of claim 12 wherein said ire is a copper containing chalcopyrite.

* * * * *